Aug. 30, 1960
J. H. WILSON
2,950,899
CHAIN POSITIONING TOOL
Filed Feb. 15, 1956
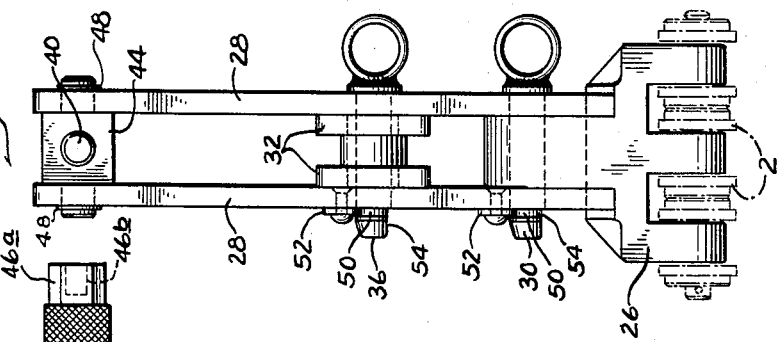
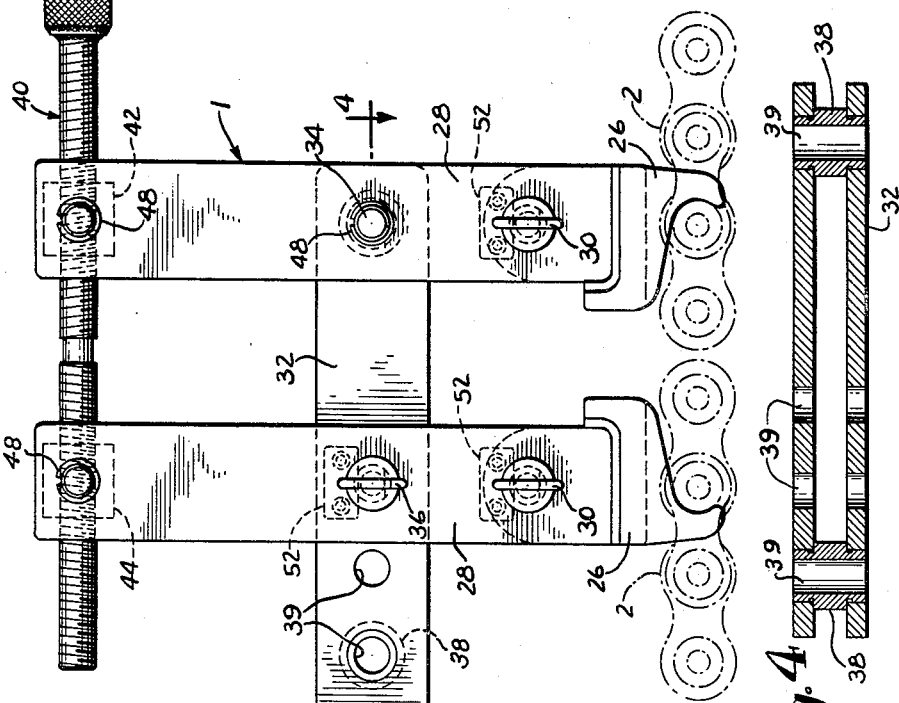
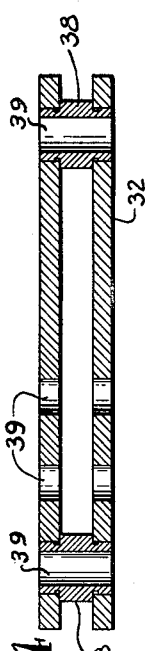
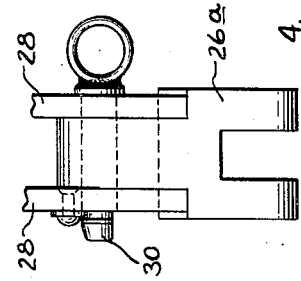
INVENTOR.
JOHN HART WILSON
BY
Watson, Cole, Grindle & Watson
attys.

United States Patent Office 2,950,899
Patented Aug. 30, 1960

2,950,899

CHAIN POSITIONING TOOL

John Hart Wilson, % Wilson Mfg. Co., P.O. Box 1031, Wichita Falls, Tex.

Filed Feb. 15, 1956, Ser. No. 565,730

1 Claim. (Cl. 254—78)

This invention relates to improvements in chain positioning tools for use in connecting roller chains and more particularly to chain positioning tools wherein the chain may be connected together within a chain guard, transmission, or other relatively inaccessible place.

Heretofore, the drawing of the ends of chain together was usually accomplished by improvised methods, such as twisting wire which has been threaded through the links of adjacent ends of the chain, a small piece of rope used as a block and tackle, or some pullers of a ratchet type have been used, however, since the end links of the chain must be accurately positioned to insert the pin link, the drawing of the chain together in exact relation by ratchet steps is very unsatisfactory, and the steps of the ratchet puller are usually one-fourth inch or more in length, so when one position of the ratchet puller would space the ends of the chain too far apart, another step would be too short to allow the insertion of the pin link, so either position would make the connecting of the chain with a connecting link a difficult operation.

The use of the present device enables the drawing of the chain together into the correct spaced, parallel relation of the pitches thereof, and enables the holding of the chain in this relation until the connecting links may be inserted thereinto for the connection thereof.

For connecting chain, which is housed within a chain guard, a transmission or the like, where the casing restricts accessibility to the top and sides of the chain, the present device has been designed, and is so constructed as to extend inward into the casing and to exert a pulling action on the chain so as to bring the ends thereof into correct spaced relation to enable the insertion of a connecting link for coupling the chain in endless relation.

An object of this invention is to provide a chain positioning device which will draw the extremities of a chain into end-to-end relation and to hold the ends thereof in proper spaced relation to enable the insertion of a connecting link thereinto.

Another object of the invention is to provide a chain positioning tool which may be readily adjusted so as to be used on chains of various pitch sizes and numbers of strands.

Still another object of the invention is to provide a chain positioning tool which is light in weight, powerful in action, and which is easy and effective to use.

Yet a further object of the invention is to provide a chain positioning tool which has easily detachable chain engaging hooks of various sizes so as to fit all standard chains, and which hooks can be readily attached, used, and detached.

Yet another object of the invention is to provide a chain positioning tool which is simple in construction, low in cost, which tool is readily disassembled and reassembled, and the use of which simplifies the connection of chain, the positioning of the ends of which, for the insertion of a connecting pin link, would otherwise be difficult.

With these objects in mind and others which will become manifest as the description proceeds, reference is to be had to the accompanying drawings in which like reference characters designate like parts in the several views thereof, in which:

Fig. 1 is a side elevational view of the chain positioning tool, showing a fragmentary portion of a transmission chain, such as a roller chain, in dot-dash outline;

Fig. 2 is an end elevational view of the device as shown in Fig. 1, and showing chain engaging members thereon for engaging triple width chain, the chain being shown in dot-dash outline;

Fig. 3 is a fragmentary view of a portion of the chain positioning tool, showing a chain engaging member thereon for engaging a double strand chain; and Fig. 4 is a longitudinal sectional view through a connecting link member of the chain positioning tool, taken on the line 4—4 of Fig. 1, looking in the direction indicated by the arrows.

With more detailed reference to the drawing, the numeral 1 designates generally, a chain positioning tool, as shown in Figures 1 and 2, for drawing together transmission chain 2, preparatory to inserting a connecting link into the chain.

The chain tool 1 comprises a pair of fulcrum arms 28, each of which arms 28 comprises two parallel, spaced apart bars. The fulcrum arms 28 each have aligned apertures through each end thereof, and intermediate the ends thereof. One end of each of the arms 28 is adapted to receive a chain engaging hook 26 between the bars thereof, which chain engaging hooks have apertures therein, so when fitted in place between the parallel bars of the arms 28, the aperture therein will align with the apertures in the ends of the bars, so that a pin 30 will pass through the apertures in the ends of the bars of each fulcrum arm and through the aperture in the respective hooks, to hold the chain engaging hook in place, substantially as shown in Fig. 2. A pair of connector bars 32, each have a series of apertures 39 therein, which apertures are spaced apart. The respective connector bars 32 each have a shouldered bushing 38 fitted therein, which bars are adapted to fit intermediate the parallel bars forming the respective fulcrum arms 28, so a pivot pin 34 may be inserted therethrough and through the parallel bars of the fulcrum arms 28. A removable pin 36 is adapted to be positioned through the other of the parallel bars of the fulcrum arms 28 and through holes in the fulcrum arms 28 and through holes 39 within the connector bars 32.

A pair of swivel blocks 42 and 44 each have reduced end portions, which swivel blocks are positioned between each pair of parallel bars of the fulcrum arms 28 with the respective reduced portions thereof mounted in holes in the parallel bars so that the respective swivel blocks will be pivoted in the respective pairs of bars. The swivel blocks are grooved near their respective outer ends to receive the respective snap rings 48 therein. Each of the swivel blocks is threaded, one with right hand threads and the other with left hand threads, to complementarily receive the respective right and left hand threaded portions on the member 40. A handle 46 is secured to the member 40, as by welding, or other suitable means. The handle 46 is preferably knurled to provide a hand grip at the outer end thereof. The extreme outer end thereof is hexed, as shown at 46a to enable a wrench to be engaged therewith. Within the end of handle 46 is formed a squared socket 46b to receive a socket wrench ratchet handle, to enable the turning of the handle 46 by means of a socket wrench. The structure just described provides a tool which has great strength, but which is relatively light in weight, in view of the type of work to be performed thereby.

It is preferable to have a groove 50 formed around each of the quick detachable pins 30 and 36, with the respective grooves 50 engaging with a pin retainer lug 52 which is secured to a side of each fulcrum arm 28. One side of each of the pins 30 and 36 is flattened, as indicated at 54, to enable each of the pins to be positioned so that the flattened portion thereof will be adjacent the respective lugs 52 to enable longitudinal movement of the respective pins 30 and 36. By turning each of the pins 30 and 36 so that the groove 50 therein will engage retained lug 52, each of the pins will be locked against accidental misplacement. This construction enables the attachment of hook engaging members of different size for use with chains of different width and with chains of different size, and the spacing of the fulcrum bars 28 along the length of the chain tool connecting link 32, to obtain the correct positioning of the tool with respect to the chain being connected.

While the invention has been illustrated and described in one embodiment thereof, it is to be understood that changes may be made in the minor details of construction without departing from the spirit of the invention or the scope of the appended claim.

Having thus clearly shown and described the invention, what is claimed as new and desired to be secured by Letters Patent is:

A tool for drawing the ends of a roller chain together to enable their mechanical interconnection, comprising two arms each comprising a pair of parallel, spaced apart bars, a connecting bar which connecting bar is positioned between said pairs of parallel, spaced apart bars, said arms being pivoted, intermediate their ends, on said connecting bar, a screw-threaded swivel mounted between said respective pairs of parallel bars on each of two adjacent ends of said arms, a screw-threaded element in threaded engagement with both said swivels, means for rotating said screw-threaded element, a pair of chain engaging elements, each of which chain engaging elements has at least two chain engaging hooks thereon, which chain engaging hooks of said respective elements are in oppositely facing relation, the opposite end of said chain engaging elements each having a shouldered face thereon to complementally engage the respective ends of said parallel arms in close fitting relation and with said shoulder of each of said chain engaging elements extending downwardly along the inner face of each of said parallel arms, said chain engaging elements each having an apertured lug extending outwardly therefrom on the ends thereof opposite said chain engaging hooks, said parallel arms each having an aperture formed therethrough on the opposite adjacent ends of said arms, so the apertures in the respective lugs will register with the aperture in the respective parallel arms, and a pin adapted to fit in the apertures of the respective arms and the respective lugs.

References Cited in the file of this patent

UNITED STATES PATENTS

| | | |
|---|---|---|
| 442,733 | Shampel | Dec. 16, 1890 |
| 752,074 | Jackson | Feb. 16, 1904 |
| 2,366,141 | Alderfer | Dec. 26, 1944 |
| 2,382,447 | Schaeufele | Aug. 14, 1945 |
| 2,387,551 | Abramson | Oct. 23, 1945 |
| 2,561,581 | Macerata | July 24, 1951 |

FOREIGN PATENTS

| | | |
|---|---|---|
| 582,077 | Great Britain | Nov. 4, 1946 |